US010151588B1

(12) United States Patent
Singh et al.

(10) Patent No.: US 10,151,588 B1
(45) Date of Patent: Dec. 11, 2018

(54) DETERMINING POSITION AND ORIENTATION FOR AERIAL VEHICLE IN GNSS-DENIED SITUATIONS

(71) Applicants: Near Earth Autonomy, Inc., Pittsburgh, PA (US); Carnegie Mellon University, Pittsburgh, PA (US)

(72) Inventors: Sanjiv Singh, Pittsburgh, PA (US); Jeffrey Mishler, Pittsburgh, PA (US); Michael Kaess, Pittsburgh, PA (US); Garrett Hemann, Pittsburgh, PA (US)

(73) Assignee: NEAR EARTH AUTONOMY, INC., Pittsburgh, PA (US)

( * ) Notice: Subject to any disclaimer, the term of this patent is extended or adjusted under 35 U.S.C. 154(b) by 0 days.

(21) Appl. No.: 15/711,492

(22) Filed: Sep. 21, 2017

Related U.S. Application Data

(60) Provisional application No. 62/400,710, filed on Sep. 28, 2016.

(51) Int. Cl.
| | | |
|---|---|---|
| *G01C 21/16* | (2006.01) | |
| *G06T 7/70* | (2017.01) | |
| *G05D 1/10* | (2006.01) | |
| *B64C 27/04* | (2006.01) | |
| *G06T 7/73* | (2017.01) | |
| *G06T 7/246* | (2017.01) | |

(52) U.S. Cl.
CPC ............ *G01C 21/165* (2013.01); *B64C 27/04* (2013.01); *G05D 1/101* (2013.01); *G06T 7/248* (2017.01); *G06T 7/251* (2017.01); *G06T 7/74* (2017.01); *G06T 7/75* (2017.01); *G06T 2207/10032* (2013.01); *G06T 2207/30181* (2013.01); *G06T 2207/30252* (2013.01)

(58) Field of Classification Search
CPC ........... G01C 21/165; G06T 7/74; G06T 7/75; G06T 7/251; G06T 7/248; B64C 27/04
USPC .......................................................... 701/7
See application file for complete search history.

(56) References Cited

U.S. PATENT DOCUMENTS

| | | |
|---|---|---|
| 8,010,287 B1 | 8/2011 | Frank et al. |
| 8,315,794 B1 | 11/2012 | Strelow et al. |
| (Continued) | | |

FOREIGN PATENT DOCUMENTS

WO    WO 2017/042672    3/2017

OTHER PUBLICATIONS

Bachrach et al., RANGE-Robust Autonomous Navigation in GPS-denied Environments, Journal of Field Robotics, vol. 28, pp. 644-666, Aug. 9, 2011.

(Continued)

*Primary Examiner* — Tan Q Nguyen
(74) *Attorney, Agent, or Firm* — K&L Gates LLP

(57) ABSTRACT

On-board, computer-based systems and methods compute continuously updated, real-time state estimates for an aerial vehicle by appropriately combining, by a suitable Kalman filter, local, relative, continuous state estimates with global, absolute, noncontinuous state estimates. The local, relative, continuous state estimates can be provided by visual odometry (VO) and/or an inertial measurement unit (IMU). The global, absolute, noncontinuous state estimates can be provided by terrain-referenced navigation, such as map-matching, and GNSS. The systems and methods can provide the real-time, continuous estimates even when reliable GNSS coordinate data is not available.

13 Claims, 2 Drawing Sheets

(56) References Cited

U.S. PATENT DOCUMENTS

Figure 1:
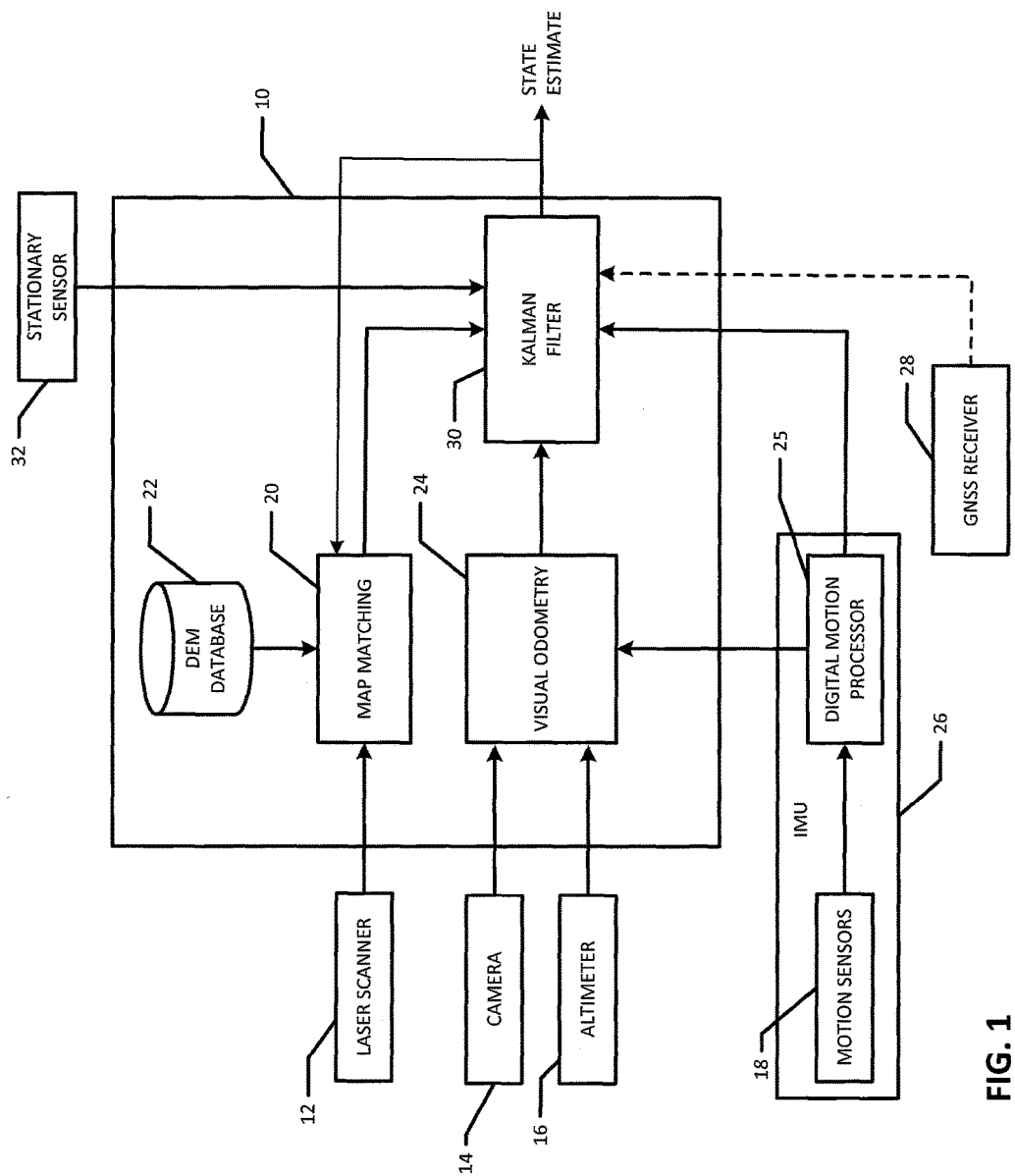

| | | | |
|---|---|---|---|
| 9,389,298 B2* | 7/2016 | Smithernnan | G01C 11/02 |
| 2014/0022262 A1* | 1/2014 | Mohr | G01C 11/00 |
| | | | 345/501 |
| 2014/0088790 A1* | 3/2014 | Vukman | G01C 21/165 |
| | | | 701/1 |
| 2016/0140729 A1 | 5/2016 | Soatto et al. | |
| 2016/0335901 A1 | 11/2016 | Singh et al. | |

OTHER PUBLICATIONS

Chowdhary et al., "GPS-denied Indoor and Outdoor Monocular Vision Aided Navigation and Control of Unmanned Aircraft," Journal of Field Robotics, vol. 30, pp. 415-438 (2013).

Hardy et al., "Unmanned aerial vehicle relative navigation in GPS denied environments," Position, Location and Navigation Symposium (PLANS), 2016 IEEE/ION, Apr. 2016.

Hemann, Garrett, Singh, Sanjiv and Kaess, Michael, "Long-range GPS-denied Aerial inertial Navigation with LIDAR Localization," 2016 IEEE/RSJ International Conference on Intelligent Robots and Systems (IROS), Oct. 2016, Daejeon, Korea.

Liu, Chang, Nash, John and Prior, Stephen (2015), "A low-cost vision-based unmanned aerial system for extremely low-light GPS-denied navigation and thermal imaging," International Journal of Mechanical, Aerospace, Industrial, Mechatronic and Manufacturing Engineering, 9, (10), pp. 1750-1757.

Liu, Chang and Prior, Stephen (2015), "Computationally efficient visual-inertial sensor fusion for GPS-denied navigation on a small quadrotor," At 2015 International conference on Innovation, Communication and Engineering, China. Oct. 23-28, 2015.

Liying et al., "A Robust Real-Time Vision based GPS-denied Navigation System of UAV," The 6th Annual IEEE International Conference on Cyber Technology in Automation, Control and Intelligent Systems, Jun. 19-22, 2016, Chengdu, China, pp. 321-326.

Scaramuzza et al.. "Vision-controlled micro flying robots: from system design to autonomous navigation and mapping in GPS-denied environments," IEEE Robotics and Automation, vol. 21, Issue 3, Sep. 2014.

Weiss et al., "Monocular-SLAM-based navigation for autonomous micro helicopters in GPS-denied environments," Journal of Field Robotics, vol. 28, pp. 854-874, Oct. 12, 2011.

Zhang et al., "Autonomous Flight Control of a Nano Quadrotor Helicopter in a GPS-Denied Environment Using On-Board Vision," IEEE Transactions on Industrial Electronics, vol. 62, Issue 10, Oct. 2015.

Zhang, Ji and Singh, Sanjiv, "Visual-Inertial Combined Odometry System for Aerial Vehicles," Journal of Field Robotics, vol. 32, No. 8, pp. 1043-1055, 2015.

* cited by examiner

DETERMINING POSITION AND ORIENTATION FOR AERIAL VEHICLE IN GNSS-DENIED SITUATIONS

PRIORITY CLAIM

The present application claims priority to U.S. provisional patent application Ser. No. 62/400,710, filed Sep. 28, 2016, with the same title and inventors as the present application, and which is incorporated herein by reference in its entirety.

STATEMENT REGARDING FEDERALLY SPONSORED RESEARCH

This invention was made with government support under Contract No. N00014-12-C-0671, awarded by the Department of the Navy. The government has certain rights in the invention.

BACKGROUND

In many applications it is necessary to determine the position, velocity, and orientation ("pose" or "state") in real-time of an aerial vehicle, such as an aircraft, particularly an autonomous aircraft. Global Navigation Satellite System (GNSS) coordinates (e.g., GPS coordinates in the U.S.) are often used in this process. However, sometimes GNSS signals can be lost (i.e., not received or jammed) or there can be errors in the received GNSS coordinates (including through spoofing).

SUMMARY

In one general aspect, the present invention is directed to on-board, computer-based systems and methods that compute continuously updated, real-time state estimates for an aerial vehicle by appropriately combining, by a suitable Kalman filter or other suitable sensor fusion algorithm, local, relative, continuous state measurements with global, absolute, noncontinuous state measurements. The local, relative, continuous state measurements can be provided by visual odometry (VO) and/or an inertial measurement unit (IMU). The global, absolute, noncontinuous state estimates can be provided by terrain-referenced navigation techniques, such as map-matching, or GNSS. Moreover, the systems and methods described herein can provide the real-time, continuous state estimates even when reliable GNSS coordinate data are not available. The systems and method described herein are particularly useful for state estimation of an aircraft, such as an autonomous aircraft.

FIGURES

Figure 2:
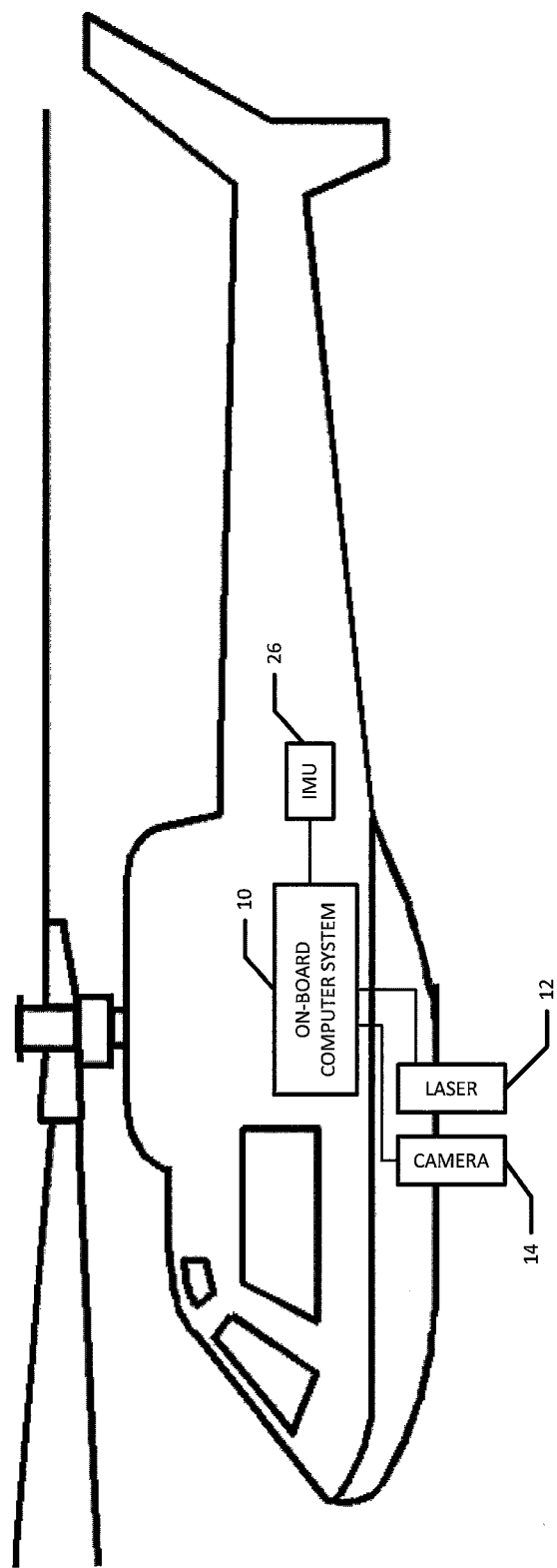

Various embodiments of the present invention are described herein by way of example in connection with the following figures, wherein:

FIG. 1 is a block diagram of an on-board computer system for generating real-time, continuously updated state estimates of an aerial vehicle or object according to various embodiments of the present invention; and FIG. 2 is a diagram of a rotorcraft including the on-board computer system of FIG. 1 according to various embodiments of the present invention.

DESCRIPTION

In one general aspect, the present invention is directed to a computer-based system that generates real-time, state estimates of an aerial vehicle (or other type of airborne moving object) whose position, velocity, acceleration and/or attitude needs to be tracked at it moves, such as an aircraft, including an autonomous aircraft. Such a system is particularly valuable when GNSS coordinate data are not available for tracking purposes. As used herein, "real-time" means with sufficient speed/frequency for the other systems of the aerial vehicle that need the state estimates in order to operate, such as to navigate the aerial vehicle.

A block diagram of the state estimation system 8 according to various embodiments of the present invention is shown in FIG. 1. The illustrated system comprises an on-board computer system 10 that is on the aerial vehicle, along with a number of on-board sensors. The sensors can include a 2D laser scanner 12, a camera system 14, an altitude sensor/altimeter 16, and various motion sensors 18, such as a 3-axis accelerometer system, a gyroscope, and/or magnetometers. The 2D laser scanner 12 is pointed at the ground surface below the aerial vehicle/object, at least for a sufficient portion of the time that the vehicle/object is airborne, to capture 2D laser scanning data points of the ground surface that are used by a map-matching module ("MMM") 20 of the on-board computer system 10. In various embodiments, the MMM 20 matches a sensor-based digital elevation model (DEMs) with pre-loaded DEMs. For example, the MMM 20 can generate updates of the vehicle's position and orientation (pose) by comparing the data points from laser scans of the ground by the laser scanner 12 to DEMs stored in a DEM database 22. The DEM database 22 can store DEMs from the area over which the vehicle will be traveling. In this description, it is assumed that the sensor-based DEMs are generated from the scans by the laser scanner 12 of the surface below the vehicle, although in other embodiments, other types of sensors (in addition to or in lieu of the laser scanner 12) can be used to generate the sensor-based DEMs. When a match between the sensor-based DEM and a pre-loaded DEM in the database 22 is found, the pose of the vehicle can be determined for that instant in time—the pose at the time stamp for the matching sensor-based DEM. Further, the current state estimate of the vehicle can be used to limit the DEMs that are searched so that DEMs in the estimated vicinity of the vehicle are searched first for a match to thereby accelerate the DEM-searching operation. The MMM 20 can, therefore, provide estimated (x, y, z) coordinates and heading information for the vehicle at various times (the time instances where matches where found). The accuracy of the estimate will depend on the accuracy or resolution of the sensor-based and pre-loaded DEMs. More details about a suitable DEM-matching system are provided in Garrett Hemann, Sanjiv Singh and Michael Kaess, "Long-range GPS-denied Aerial Inertial Navigation with LIDAR Localization," 2016 IEEE/RSJ International Conference on Intelligent Robots and Systems (IROS), October 2016, Daejeon, Korea, which is incorporated herein by reference in its entirety.

The 2D laser scanner 12 could be a dedicated 2D laser scanner or part of a more complex laser scanner system that also points ahead of the vehicle from time to time for navigational purposes, but also is pointed at the ground surface for a sufficient amount of time for DEM matching purposes. The laser scanner 12 should also have a range and resolution suitable for the flying height of the aerial vehicle.

The camera system 14 can comprise one or more cameras that are pointed at the ground surface, at least for a sufficient amount of time, for collecting image data to be used by a visual odometry (VO) module 24 of the on-board computer system 10. The VO module 24 continuously computes updated state estimates of the vehicle by comparing time-stamped ground surface images taken from different points in time. The VO module 24 can detect features in the ground surface images and match them across image frames to construct an optical flow field in order to generate a state estimate for the vehicle. To that end, the VO module can estimate the real-time $\dot{x}$, $\dot{y}$, $\dot{z}$, $\dot{\phi}$, $\dot{\theta}$, and/or $\dot{\psi}$ values for the vehicle, where the dot indicates the first derivative (velocity, in this case the velocity in the x, y, and z coordinate directions and the angular roll ($\phi$), pitch ($\theta$) and yaw ($\psi$) velocities). The accuracy and resolution of the VO system will depend on the accuracy and resolution of the camera and altitude sensor; in some instances the accuracy can be about +/−1 m/s. The altitude sensor 16 senses the vehicle's altitude relative to the ground surface, which is important for determining scale in the VO process. Any suitable altitude sensor 14 could be used, although the more accurate the better. The altitude sensor 14 could be, for example, a laser range finder, or a radar altimeter. The camera(s) preferably has a sufficient frame rate and resolution, considering the flying height and speed of the vehicle. The camera(s) could also have a high dynamic range. More details about an exemplary VO system that could be used in various embodiments of the present invention can be found in Ji Zhang and Sanjiv Singh, "Visual-Inertial Combined Odometry System for Aerial Vehicles," Journal of Field Robotics, vol. 32, no. 8, pp. 1043-1055, 2015, which is incorporated herein by reference in its entirety.

The motion sensors 18 may be part of an inertial measurement unit (IMU) 26. The IMU 26 may include a digital motion processor (DMP) 25 or other suitable type of processor that continuously measures, in real time, based on the output of the motion sensors 18, both (1) the vehicle's acceleration in the x, y, and z directions (i.e., measures $\ddot{x}$, $\ddot{y}$, $\ddot{z}$, where the double dot indicates the second derivative, acceleration) and (2) the vehicle's roll, pitch and yaw velocity ($\dot{\phi}$, $\dot{\theta}$, and $\dot{\psi}$). The DMP 25 of the IMU 26 is shown in FIG. 1 separate from the on-board computer system 10 but in other embodiments it could be included as part of the on-board computer system 10.

As shown in FIG. 1, the state estimation system 8 can also comprise a GNSS receiver that, when working properly, continuously receives updated GNSS coordinates (x, y, z) for the vehicle from GNSS satellites. Sometimes, however, the GNSS satellite signals cannot be received by the GNSS receiver 28 or the GNSS coordinate information is jammed or spoofed. That is why the on-board computer system 10 uses the state estimates from the MMM 20, the VO module 24, the IMU 26 and the GNSS receiver 28 (when available) to compute a multi-dimensional state estimate for the vehicle. In various embodiments, the on-board computer system 10 uses a Kalman filter 30 to compute the state estimate. The Kalman filter 30 uses the output data from the various systems (e.g., MMM, VO, IMU, and GNSS when available) as well as information about the uncertainties in each of those estimates, in order to compute a more reliable state estimate for the vehicle. To that end, it should be recognized that the state estimates from the VO module 24 and the IMU 26 are continuous, but are less absolutely certain due to inherent drift. On the other hand, the map-matching (MM) state estimate possesses more certainty (absolute) but is not continuous. The VO and IMU estimates are also local estimates, relative to prior estimates, whereas the map-matching estimate is global, as is the GNSS estimate.

The Kalman filter 30 may use both a propagation phase and a measurement update phase. In the propagation phase, the IMU measurements can be used to obtain estimates of the vehicle's motion or position. For example, the Kalman filter can integrate linear and angular rates to compute a state estimate for the vehicle, as well as determine estimated uncertainties corresponding to the estimated state. With iterations of the integration step, the estimated uncertainties can increase. In the measurement update phase, measurements from the map-matching, VO and GNSS systems can be used to update the estimate from the propagation phase. In various embodiments, a tightly coupled error-state Kalman filter (ESKF) or unscented Kalman filter (UKF) is used to generate the real-time state estimates for the vehicle. The Kalman filter can estimate values for, for example, up to 15 degrees of freedom (DOF) for the vehicle ((x, y, z, $\phi$, $\theta$, $\psi$, $\dot{x}$, $\dot{y}$, $\dot{z}$), Gyro bias (roll, pitch, yaw) and accelerometer bias (x, y, z)). Fewer or more DOFs could be used in other applications. When the GNSS coordinate data is not available or spoofed, the Kalman filter 30 can use just the map-matching and/or VO estimates for the measurement update.

The state estimation system 8 may also comprise a sensor 32 (or multiple sensors) for detecting whether the otherwise moving aerial vehicle is stationary, such as if it is landed. The Kalman filter 30 can additionally use the stationary sensor outputs in estimating the state estimate of the vehicle. The stationary sensor 32 could comprise, for example, ground pressure or landing gear pressure sensors that detect when it is landed. Also, the IMU 26 could be used to detect whether the vehicle is stationary. The outputs from lidar/laser scanning and/or camera systems 12, 14, as well as a laser altimeter if one is used, could also be used to determine if the vehicle is stationary.

Where the moving vehicle is a piloted aircraft, the state estimate can be used by a guidance system of the aircraft to guide the flight crew to a destination. Where the moving vehicle is an autonomous aircraft, the state estimate can be used by a computerized navigational system of the autonomous aircraft. U.S. patent application Ser. No. 15/152,944, filed May 12, 2016, entitled "On-board, Computerized Landing Zone Evaluation System for Aircraft," owned by Near Earth Autonomy, Inc., provides more details about navigation and flight planning systems for aircraft, and is incorporated herein by reference in its entirety.

In that connection, embodiments of the present invention are directed to an autonomous aircraft that is navigable without GNSS coordinate data from one location to the next, and so on. The aircraft may be a rotorcraft (e.g., a helicopter), as shown in the example of FIG. 2. The illustrated rotorcraft includes the on-board computer system 10, including the state estimation system software as well as software for controlling the navigation of the aircraft based on the state estimation. The aircraft also includes the plurality of sensor systems, such as the laser scanner 12, the camera system 14, the altimeter 16 (see FIG. 1; not shown in FIG. 2), and the motion sensors 18 for the IMU 26. The stationary sensor 32 and GNSS 28 are not shown in FIG. 2, although the rotorcraft could also include these systems. In addition, for clarity, the helicopter's landing skids are not shown in FIG. 2.

The on-board computer system is programmed to navigate the aircraft in the absence of GNSS coordinate data from a first starting ground location to a second, destination ground location, and so on, by continuously updating the state estimate of the aircraft in multiple dimensions (e.g., 6, 9, 12 or 15) and controlling the navigation of the aircraft based on the aircraft's continuously updated state estimate.

The on-board computer system continuously updates the state estimate with a Kalman filter by:

continuously updating the state estimate of the aircraft, in multiple dimensions, as the aircraft travels from the first location to the second and so on, based on input data from the IMU when the measurements from VO and MM systems are insufficiently accurate, such as when the aircraft is at low altitude on take-off or landing, or other times as applicable; and upon a determination that the measurements from VO and/or MM systems are sufficiently accurate, using the VO and/or MM measurements, or both as the case may be, in addition to the IMU data, to continuously update the vehicle's state estimate in multiple dimensions.

To that end, the map-matching measurements, when available, can provide a global, absolute, noncontinuous terrain-referenced update to the local, relative, continuous estimates from the IMU and VO systems. The GNSS coordinates, when available, can also provide a global position estimate for the aerial vehicle that can be used by the Kalman filter to update the local, relative, continuous estimates from the IMU and VO systems.

Both MM and VO can fail under certain environmental conditions. LIDAR requires sufficient terrain variation to obtain a good match, and VO requires images containing sufficient visual texture to enable tracking features from one frame to the next. Likewise, the altitude of the vehicle above the ground can affect the performance of both algorithms: too low, and the MM algorithm cannot generate a sufficiently large region to provide a DEM match; too high, and the LIDAR may be unable to image the ground. VO can fail when the altitude is too low because the image motion is larger. VO can also fail when the altitude is too high because the laser altimeter cannot measure the distance to ground.

When maps of the anticipated flight area are available, these maps can be used to adjust the desired flight path to maximize the information gained along the path. This process consists of modeling the information content of the environment, and then planning trajectories that consider the environmental model and desired flight path. An example would be flying beside a river rather than directly over the center of the river, such that the MM and VO algorithms have sufficient terrain and texture for optimal performance. Maximizing information gain along a trajectory is sometimes called Coastal Navigation, as referenced in Roy, Nicholas, Burgart, Wolfram, Fox, Dieter, and Thrun, Sebastian in "Coastal Navigation—Mobile Robot Navigation with Uncertainty in Dynamic Environments," IEEE International Conference on Robotics and Automation (ICRA), 1999 pp 35-40, vol. 1.

In other embodiments, other sensor fusion algorithms could be used instead of or in addition to the above-described Kalman filter. Other suitable sensor fusion algorithms can include the Central Limit Theorem, Bayesian networks, and/or the Dempster-Shafer information filtering framework. Also, other image-based navigation systems, utilizing the downward-pointing camera system 14, could be used instead of, or in addition to, the DEM matching described above. Such other image-based navigation techniques that could be used include (i) spatial (or space) resectioning that compares image boundaries to a stored database of boundaries (for more details, see K. Miser et al., "Differential spatial resection-pose estimation using a single local image feature." Computer Vision-ECCV 2008 (2008): 312-325, which is incorporated herein by reference in its entirety); (ii) image matching, where (similar to DEM) a high resolution image is matched to a database of images taken from known locations; (iii) comparing invariant feature descriptors (invariant to viewpoint, scale, rotation, illumination, computed by SIFT, SURF, and/or BRIEF methods for example) to a stored database (for more details, see Hide, C. et al., "An integrated IMU, GNSS and image recognition sensor for pedestrian navigation." Proceedings of International Technical Meeting of The Satellite Division of the Institute of Navigation (ION GNSS 2009), which is incorporated herein by reference in its entirety).

The on-board computer system 10 may comprise one or more, preferably multi-core, processors and one or more memory units. The memory units may comprise software or instructions that are executed by the processor(s), including the MMM 20, VO module 24, and the Kalman filter 30 modules described above. The memory units that store the software/instructions that are executed by the processor may comprise primary computer memory, such as RAM or ROM, and/or secondary computer memory, such as hard disk drives and solid state drives. That is, the modules 20, 24, 25, 28 and 30 may comprise software, stored in a memory unit, that when executed by the processor(s) of the on-board computer system 10 cause the processor(s) to perform the operations described above. In addition, the stationary sensor 32 could comprise software that is executed by a processor of the stationary sensor 32 or of the computer system 10. The DEM database 22 may be stored in secondary computer memory. In various embodiments, the modules are part of a single on-board computer device (e.g., a single laptop, PC or server), and the DEM database is implemented with its own dedicated on-board server. The software modules and other computer functions described herein may be implemented in computer software using any suitable computer programming language such as C#/.NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An on-board state estimation system for an aerial vehicle, the system comprising:

a computer database that stores a pre-loaded digital elevation model (DEM) for a ground surface over which the aerial vehicle is to fly;
a sensor suite comprising one or more sensors, wherein the one or more sensors comprise:
an altitude sensor for sensing an above-ground altitude of the aerial vehicle;
one or more downward-pointed cameras such that the one or more cameras are pointed at the ground when the aerial vehicle is in the air; and
at least one downward-pointing laser scanner such that the at least one downward-pointing laser scanner is pointed at the ground surface when the aerial vehicle is in the air;
means, responsive to the sensor suite, for determining local, relative, continuous state estimates of the aerial vehicle as it moves, wherein the means for determining the local, relative, continuous state estimates comprise:
a visual odometry (VO) system that is in communication with the one or more downward-pointed cameras and the altitude sensor, wherein the VO system continuously computes updated local state estimates of the aerial vehicle by comparing time-stamped ground surface images taken at different points in time, using the sensed altitude of the aerial vehicle from the altitude sensor for scaling the time-stamped ground surface images; and
an inertial measurement unit (IMU) that is in communication with the one or more motion sensors and continuously measures acceleration of the aerial vehicle in three dimensions and angular velocities for roll, pitch and yaw for the aerial vehicle based on input from motion sensors that detect motion of the vehicle;
means, responsive to the sensor suite, for determining global, absolute, noncontinuous state estimates of the aerial vehicle as it moves, wherein the means for determining the global, absolute, noncontinuous state estimates comprise terrain referenced navigation means; and
state estimation means for determining continuously updated state estimates for the aerial vehicle as it moves without a need for GNSS coordinates by combining the local, relative, continuous state estimates with the global, absolute, noncontinuous state estimates.

2. The on-board state estimation system of claim 1, wherein the state estimation means comprises a Kalman filter.

3. The on-board state estimation system of claim 1, wherein the terrain referenced navigation means determines the global, absolute, noncontinuous state estimates of the aerial vehicle by comparing a DEM generated from data points from laser scans from the at least one downward-pointing laser scanner to the pre-loaded DEM stored in the computer database to find a sufficient match.

4. The on-board state estimation system of claim 3, wherein the state estimation means comprises a Kalman filter.

5. The on-board state estimation system of claim 4, wherein the terrain referenced navigation means uses a current state estimate of the aerial vehicle to constrain searching of the pre-loaded DEM to find a sufficient match between the pre-loaded DEM and the DEM generated from the data points from the laser scans.

6. The on-board state estimation system of claim 4, wherein the at least one downward-pointing laser scanner comprises at least one 2D laser scanner.

7. The on-board state estimation system of claim 4, wherein the at least one downward-pointing laser scanner comprises a moveable laser scanner that points downward at the ground surface for a sufficient period of time for the terrain referenced navigation means while the aerial vehicle moves.

8. The on-board state estimation system of claim 4, further comprising a GNSS receiver, wherein the state estimation means further uses GNSS coordinates from the GNSS receiver, when available, to determine the continuously updated state estimates for the aerial vehicle as it moves.

9. An aerial vehicle comprising:
a sensor suite that comprises one or more sensors, wherein the one or more sensors comprise:
an altitude sensor for sensing an above-ground altitude of the aerial vehicle;
one or more downward-pointed cameras such that the one or more cameras are pointed at the ground when the aerial vehicle is in the air; and
at least one downward-pointing laser scanner such that the at least one downward-pointing laser scanner is pointed at the ground surface when the aerial vehicle is in the air; and
an inertial measurement unit (IMU) that is in communication with the one or more motion sensors and continuously measures acceleration of the aerial vehicle in three dimensions and angular velocities for roll, pitch and yaw for the aerial vehicle based on input from motion sensors that detect motion of the vehicle; and
a computer system in communication with the sensor suite, wherein the computer system comprises:
a computer database that stores a pre-loaded digital elevation model (DEM) for a ground surface over which the aerial vehicle is to fly;
at least one processor; and
at least one memory unit that stores software that is executed by at least one processor, wherein the software comprises:
a visual odometry (VO) module that that continuously computes updated local state estimates of the aerial vehicle by comparing time-stamped ground surface images taken at different points in time by the one or more downward-pointed cameras, using a sensed altitude of the aerial vehicle from the altitude sensor for scaling the time-stamped ground surface images;
a terrain referenced navigation module that determines global, absolute, noncontinuous state estimates of the aerial vehicle by comparing a DEM generated from data points from laser scans of the ground surface by the at least one downward-pointing laser scanner to the pre-loaded DEM stored in the computer database to find a sufficient match; and
a state estimation module for determining continuously updated state estimates for the aerial vehicle as it moves without a need for GNSS coordinates by combining the local, continuous state estimates from the VO module with outputs from the IMU and with the global, absolute, noncontinuous state estimates from the terrain referenced navigation module.

10. The aerial vehicle of claim 9, further comprising a guidance system, wherein the continuously updated state estimates for the aerial vehicle from the state estimation module are input to the guidance system.

11. The aerial vehicle of claim 9, further comprising a computerized navigational system, wherein the continuously updated state estimates for the aerial vehicle from the state estimation module are input to the computerized navigational system.

12. The aerial vehicle of claim 11, wherein the state estimation module comprises a Kalman filter.

13. The aerial vehicle of claim 12, wherein the aerial vehicle comprises a rotorcraft.

* * * * *